United States Patent
Kolmeder et al.

(10) Patent No.: US 10,844,915 B2
(45) Date of Patent: Nov. 24, 2020

(54) METHOD AND CONTROL UNIT FOR AVOIDING FAILURE IN THE DRIVETRAIN OF A VEHICLE

(71) Applicant: Bayerische Motoren Werke Aktiengesellschaft, Munich (DE)

(72) Inventors: Sebastian Kolmeder, Mainburg (DE); Frank Albertz, Allershausen (DE); Gerhard Ronner, Hebrontshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 261 days.

(21) Appl. No.: 15/966,237

(22) Filed: Apr. 30, 2018

(65) Prior Publication Data

US 2018/0245644 A1  Aug. 30, 2018

Related U.S. Application Data

(63) Continuation of application No. PCT/EP2016/075896, filed on Oct. 27, 2016.

(30) Foreign Application Priority Data

Nov. 3, 2015 (DE) .......... 10 2015 221 542

(51) Int. Cl.
*F16D 48/10* (2006.01)
*F16D 48/06* (2006.01)
*B60W 30/19* (2012.01)

(52) U.S. Cl.
CPC .......... *F16D 48/10* (2013.01); *B60W 30/19* (2013.01); *F16D 48/06* (2013.01);
(Continued)

(58) Field of Classification Search
CPC .. F16D 4/06; F16D 48/10; F16D 2500/10412; F16D 2500/3026;
(Continued)

(56) References Cited

U.S. PATENT DOCUMENTS

2002/0019263 A1* 2/2002 Jackel ................ F16F 15/1343
464/67.1
2011/0028223 A1* 2/2011 Letzer ............... F16F 15/13453
464/7
(Continued)

FOREIGN PATENT DOCUMENTS

DE  10 2006 030 142 A1  1/2008
DE  10 2009 015 149 A1  10/2009
(Continued)

OTHER PUBLICATIONS

International Search Report (PCT/ISA/210) issued in PCT Application No. PCT/EP2016/075896 dated Mar. 15, 2017 with English translation (five pages).
German-language Written Opinion (PCT/ISA/237) issued in PCT Application No. PCT/EP2016/075896 dated Mar. 15, 2017 (four pages).
German-language Search Report issued in counterpart German Application No. 10 2015 221 542.3 dated Nov. 7, 2016 with partial English translation (10 pages).

*Primary Examiner* — Huan Le
(74) *Attorney, Agent, or Firm* — Crowell & Moring LLP

(57) ABSTRACT

A method for controlling a drivetrain of a vehicle during a shift process is described. The drivetrain includes a drive engine which is connected via a bow spring dual-mass flywheel to a transmission which can be uncoupled by way of a clutch. The bow spring dual-mass flywheel includes a bow spring which is arranged in a bow spring channel. The method includes detecting that the clutch is closed within the scope of a shift process. Furthermore, the method includes generating a torque intervention at the bow spring dual-mass flywheel independently of a torque request by a driver of the vehicle, in such a way that the bow spring is arranged on the same side of the bow spring dual-mass flywheel after the closing of the clutch as before the opening of the clutch.

18 Claims, 2 Drawing Sheets

(52) U.S. Cl.
CPC .............. *F16D 2500/10412* (2013.01); *F16D 2500/3026* (2013.01); *F16D 2500/3065* (2013.01); *F16D 2500/3067* (2013.01); *F16D 2500/30415* (2013.01); *F16D 2500/30816* (2013.01); *F16D 2500/3166* (2013.01); *F16D 2500/50293* (2013.01); *F16D 2500/50653* (2013.01); *F16D 2500/50684* (2013.01); *F16D 2500/7041* (2013.01); *F16D 2500/7109* (2013.01)

(58) Field of Classification Search
CPC ... F16D 2500/30415; F16D 2500/3067; F16D 2500/30816; F16D 2500/3166; F16D 2500/50293; F16D 2500/50684; F16D 2500/7041; F16D 2500/7109; B60W 30/19
See application file for complete search history.

(56) References Cited

U.S. PATENT DOCUMENTS

| | | |
|---|---|---|
| 2014/0162794 A1 | 6/2014 | Phillips |
| 2016/0047435 A1* | 2/2016 | Voegtle ................. F16F 15/145 464/66.1 |

FOREIGN PATENT DOCUMENTS

| | | |
|---|---|---|
| DE | 10 2011 086 927 A1 | 6/2012 |
| DE | 10 2012 214 361 A1 | 2/2014 |
| DE | 10 2013 224 531 A1 | 6/2014 |
| DE | 20 2014 003 531 A1 | 7/2015 |
| JP | 58-134232 A | 8/1983 |
| WO | WO 02/093033 A1 | 11/2002 |

* cited by examiner

METHOD AND CONTROL UNIT FOR AVOIDING FAILURE IN THE DRIVETRAIN OF A VEHICLE

CROSS REFERENCE TO RELATED APPLICATIONS

This application is a continuation of PCT International Application No. PCT/EP2016/075896, filed Oct. 27, 2016, which claims priority under 35 U.S.C. § 119 from German Patent Application No. 10 2015 221 542.3, filed Nov. 3, 2015, the entire disclosures of which are herein expressly incorporated by reference.

BACKGROUND AND SUMMARY OF THE INVENTION

The invention relates to a method and to a corresponding control unit for avoiding failure in the drivetrain of a motor vehicle.

The drivetrain of a motor vehicle can include an internal combustion engine and a manual transmission with a manually operated clutch. Furthermore, the drivetrain can include a bow spring dual-mass flywheel for uncoupling nonuniformity of rotation between the internal combustion engine and the rest of the drivetrain. In order to allow smooth shifting processes to a lower or higher gear, a connection rotation speed control device can be provided on the engine controller side, which connection rotation speed control device can match the rotation speed of the internal combustion engine to an input rotation speed of the transmission in a shifting process.

In drivetrains with a bow spring dual-mass flywheel (DMF for short), a shifting process can be followed by sudden movements, in particular so-called failures, which can be found to be unpleasant for an occupant of a vehicle. The present application is concerned with the technical problem of providing a method and a corresponding control unit by way of which failures of this kind can be avoided.

This and other objects are achieved by way of a method for controlling a drivetrain of a vehicle during a shifting process and a corresponding control unit, in accordance with embodiments of the invention.

One aspect describes a method for controlling a drivetrain of a vehicle during a shifting process. The drivetrain includes an engine (in particular an internal combustion engine) which is connected by way of a bow spring dual-mass flywheel (DMF) to a transmission which can be uncoupled by a clutch. In this case, the clutch can be manually opened and closed (typically by way of a clutch pedal) by a driver of the vehicle. Furthermore, a transmission ratio of the transmission can be manually changed by the driver of the vehicle (for example by way of a shift stick).

The dual-mass flywheel includes at least one bow spring which is arranged in a bow spring channel along a rotation direction of the dual-mass flywheel (for example along a circumference of a primary flywheel disk of the dual-mass flywheel). In this case, the bow spring rotates together with the dual-mass flywheel (for example a rotation speed of 3000 revolutions/minute or more) and is pushed against an inner wall of the bow spring channel on account of centrifugal forces. This may lead to the bow spring sticking within the bow spring channel.

The method includes detecting that the clutch is closed as part of a shifting process (in particular an upshifting process). In particular, it can be detected that a driver of the vehicle initiates closing of the clutch (for example by releasing the clutch pedal). Furthermore, it can be detected that a transmission ratio of the transmission has been changed before closing the clutch (for example so that the input rotation speed of the transmission has been reduced).

Furthermore, the method can include generating a torque-transmitting engagement on the dual-mass flywheel. In this case, the torque-transmitting engagement can be generated in such a way that the static friction of the bow spring in the bow spring channel, which static friction is caused by centrifugal force, is not overcome, that is to say the torque-transmitting engagement can assist the static friction of the bow spring in the bow spring channel, which static friction is caused by centrifugal force, in order to hold the bow spring in a specific position (in particular on the same side as immediately before the shifting process). In other words, the torque-transmitting engagement can prevent the bow spring from moving within the bow spring channel and being moved to a different position. As an alternative or in addition, the bow spring can be moved to a specific, pre-defined position in the bow spring channel or can be held in this specific channel by the torque-transmitting engagement. In particular, the torque-transmitting engagement on the dual-mass flywheel can be generated in such a way that the bow spring is arranged on the same side of the dual-mass flywheel (and remains there) (immediately) after closing of the clutch as (immediately) before opening of the clutch.

The torque-transmitting engagement takes place in an automatic manner (for example by corresponding driving of the engine). In particular, the torque-transmitting engagement takes place independently of a torque request by the driver of the vehicle, for example independently of the deflection of the accelerator pedal of the vehicle.

Therefore, automatically generating a torque-transmitting engagement (for example a torque-transmitting pulse) can result in the bow spring not moving or moving less during a shifting process and thereby being moved to or held in a specific, predefined position. In this way, subsequent slipping of the bow spring through the bow spring channel and an associated noticeable jerk in the drivetrain can be avoided. In particular a failure during an acceleration process with upshifting to a higher gear can be avoided in this way.

The bow spring can be arranged in the bow spring channel on a traction side or on an overrun side of the dual-mass flywheel. In this case, the bow spring is typically situated on the traction side during traction operation of the drivetrain. On the other hand, the bow spring is typically situated on the overrun side during overrun operation of the drivetrain. During a shifting process, the drivetrain and, in particular, the dual-mass flywheel are typically not operated either in the traction mode or in the overrun mode. In particular, the dual-mass flywheel can be load-free during the shifting process. This can lead to the bow spring being located in an undefined position following a shifting maneuver. In particular, this can lead to the bow spring being located on the overrun side following an upshifting maneuver, and a failure in the drivetrain results in the event of a subsequent acceleration. Therefore, (in particular in the event of an upshifting maneuver) the torque-transmitting engagement can be designed in such a way that the bow spring remains on the traction side of the dual-mass flywheel, that is to say, not stored on the overrun side, owing to the torque-transmitting engagement. This can be effected, in particular, by a torque-transmitting engagement on the primary side of the dual-mass flywheel (for example on the primary flywheel disk of the dual-mass flywheel). A torque-transmitting engagement of this kind can be generated by the engine (for example by injecting fuel into the engine).

The torque-transmitting engagement can be generated in such a way that, during a phase in which oscillations are caused in the dual-mass flywheel owing to closing of the clutch, the static friction of the bow spring is assisted. In particular, the torque-transmitting engagement can take place before the oscillations, which are caused by closing the clutch, have died down to a predefined proportion of the original oscillation energy. The predefined proportion can be, for example, 20%, 10% or less of the original oscillation energy. Therefore, automatic torque-transmitting engagement can take place immediately after closing of the clutch, in order to influence the position of the bow spring. This is advantageous since the torque-transmitting engagement can be masked by the oscillations during the shifting maneuver (and therefore remain unnoticed by an occupant of the vehicle) in this way.

The method can include ascertaining a rotation speed of the engine or of the crankshaft. The torque-transmitting engagement and, in particular, the amplitude and/or the energy of the torque-transmitting engagement can then depend on the rotation speed of the engine. In this case, the energy or amplitude of the torque-transmitting engagement can increase as the rotation speed of the engine or the crankshaft increases. Therefore, a change in the position of the bow spring can be reliably effected. Furthermore, the impact of the torque-transmitting engagement on an occupant of the vehicle can be reduced.

The dual-mass flywheel typically includes a primary flywheel disk (which is usually rigidly connected to the crankshaft of the engine) and a secondary flywheel disk with a flange (which secondary flywheel disk is usually rigidly connected to the clutch). The primary flywheel disk and the secondary flywheel disk can be rotated in relation to one another, wherein the extent of the rotation can be damped by the bow spring. In particular, a force in the direction of a neutral position between the primary flywheel disk and the secondary flywheel disk can be effected by the bow spring. The bow spring can be compressed in the bow spring channel by a flange vane of the flange in order to transmit a torque from the primary flywheel disk to the secondary flywheel disk (or vice versa). The torque-transmitting engagement can be designed in such a way that the average torque applied by a drivetrain oscillation or by the clutch torque is compensated for by the torque-transmitting engagement. In this way, the static friction between an inner wall of the bow spring channel and the bow spring, which static friction is caused by centrifugal force, is not overcome, and the bow spring is not moved to the overrun side. In other words, the torque-transmitting engagement can assist the static friction between the inner wall of the bow spring channel and the bow spring, which static friction is caused by centrifugal force, in such a way that the bow spring remains on the same side of the dual-mass flywheel (or is stored there) as before opening of the clutch. In particular, a torque-transmitting engagement can take place which causes a force on the bow spring, which force pushes the bow spring onto that side of the dual-mass flywheel (in particular onto the traction side) on which the bow spring was arranged immediately before opening of the clutch.

The torque-transmitting engagement can take place after adjustment of a rotation speed of the engine and of an input rotation speed of the transmission. In particular, the torque-transmitting engagement can take place at a time at which a relative deviation in the crankshaft rotation speed from the input rotation speed is less than or equal to a predefined threshold value, for example a deviation threshold value of 10%, 5%, 1% or less. The torque-transmitting engagement can therefore take place at a time at which the clutch is already substantially closed.

As an alternative or in addition, the torque-transmitting engagement can take place within a predetermined time after detection of the closing process of the clutch. In this case, the time can be, in particular, 1 second, 0.5 second, 0.2 second or less. A preferred time is 0.2 second or less. The torque-transmitting engagement can therefore take place immediately after closing of the clutch, so that the drive response cannot be noticed by or at least is not surprising to an occupant of the vehicle.

The torque-transmitting engagement can have a limited duration. In particular, the torque-transmitting engagement can include a torque-transmitting pulse or correspond to a torque-transmitting pulse. The duration of the torque-transmitting engagement can be, for example, 1 second, 0.5 second, 0.2 second, 0.1 second or less. A preferred duration is 0.2 second or less. As a result, the torque-transmitting engagement can hardly be noticed or cannot be noticed at all by an occupant.

The clutch can be opened and then closed again in response to an input by the driver of the vehicle (for example by operating or releasing the clutch pedal). Furthermore, in response to an input by the driver of the vehicle (for example by operating the shift stick) when the clutch is open, a transmission ratio of the transmission can be changed in such a way that an input rotation speed of the transmission is reduced. This can be detected by a control unit of the vehicle (for example by an engine control device). The torque-transmitting engagement may possibly take place only when it has been detected that the input rotation speed of the transmission is reduced by changing the transmission ratio of the transmission (that is to say that an upshifting maneuver is being performed).

A rotation speed of the engine can be reduced, in particular by active rotation speed control, as part of the shifting process after changing the transmission ratio and before closing the clutch. A jerk when closing the clutch can be reduced in this way.

The torque-transmitting engagement (following closing of the clutch) described in the present application can take place without active adjustment of the rotation speed of the engine. In particular, the torque-transmitting engagement can take place at a substantially constant rotation speed.

A further aspect describes a control unit for a vehicle (in particular an engine control device) which is designed to execute the method described in the present application.

A further aspect describes a vehicle (in particular a motor-driven road vehicle, for example a passenger car, a truck or a motorcycle) which includes the control unit described in the present application.

A further aspect describes a software program. The software program can be designed in order to be executed on a processor (for example on a control device of a vehicle) and in order to thereby execute the method described in the present application.

A further aspect describes a storage medium. The storage medium can include a software program which is designed in order to be executed on a processor and in order to thereby execute the method described in the present application.

It should be noted that the methods, apparatuses and systems described in this document can be used both on their own and in combination with other methods, apparatuses and systems described in this document. Furthermore, any aspects of the methods, apparatuses and systems described in this document can be combined with one another in various ways. In particular, the features of the claims can be combined with one another in various ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
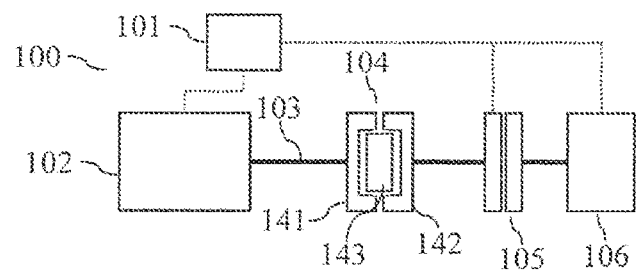
FIG. 1A is a view of exemplary components of a drivetrain of a vehicle.

As outlined in the introductory part, the present application is concerned with enabling a jerk-free shifting process in a vehicle. In this context, FIG. 1A shows an exemplary drivetrain 100 of a vehicle. An internal combustion engine 102 drives a crankshaft 103 which is coupled to the rest of the drivetrain 100, in particular to a clutch 105 and a transmission 106, by way of a bow spring dual-mass flywheel (DMF for short) 104. The dual-mass flywheel 104 has a primary flywheel disk 141 and a secondary flywheel disk 142 which are coupled to one another by way of one or more bow springs 143. The bow springs 143 allow rotation of the primary flywheel disk 141 and the secondary flywheel disk 142 in relation to one another. In this case, rotations of up to +/−70° relative to a neutral state are typically possible. In particular, rotation in the direction of a so-called traction side (for example to form positive angular degrees) results in a traction phase (for example in the event of an acceleration) and rotation in the direction of a so-called overrun side (for example to form negative angular degrees) results in an overrun phase (for example in the event of a deceleration). In this case, the one or more bow springs 143 are arranged along the circumference of the primary flywheel disk 141 or the secondary flywheel disk 142 in a bow spring channel and are compressed both in the traction direction and in the overrun direction in the event of a rotation. During operation of the internal combustion engine 102, the one or more bow springs 143 rotate at the rotation speed of the crankshaft 103 and are pushed against a lateral surface of the dual-mass flywheel 104, in particular of the bow spring channel, by centrifugal forces.

Figure 1B:
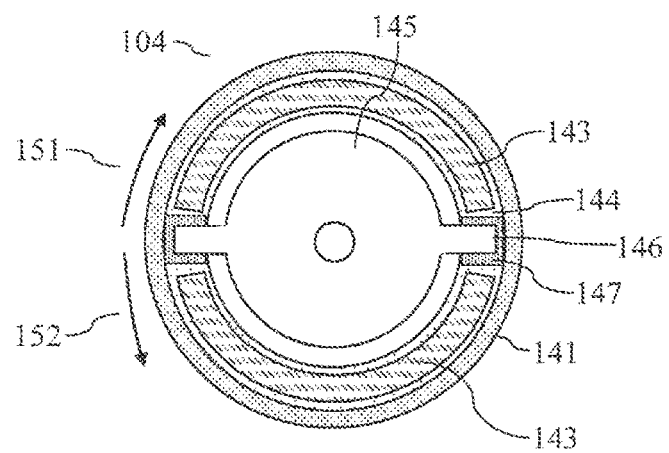
FIG. 1B is a view of an exemplary design of a dual-mass flywheel.

FIG. 1B shows an exemplary design of a dual-mass flywheel 104. In particular, FIG. 1B shows a primary flywheel disk 141 with a bow spring channel 144 into which two bow springs 143 are inserted. The bow springs 143 are fixed in place by bow spring stops 147 in the bow spring channel 144. Furthermore, FIG. 1B shows a flange 145 with flange vanes 146. The flange 145 is fixedly connected to the secondary flywheel disk 142. The flywheel flanges 146 can press the bow springs 143 within the bow spring channel 144 in the event of a rotation between the primary flywheel disk 141 and the secondary flywheel disk 142, wherein the bow springs 143 are pressed against the respective bow spring stop 147. It is possible to distinguish between the traction side 151 and the overrun side 152 depending on the direction of the rotation. In this case, a rotation in the direction of the traction side 151 takes place, for example, in an acceleration phase of the drivetrain 100. On the other hand, a rotation in the direction of the overrun side 152 can take place in the event of a deceleration phase (with clutch 105 closed).

Figure 2A:
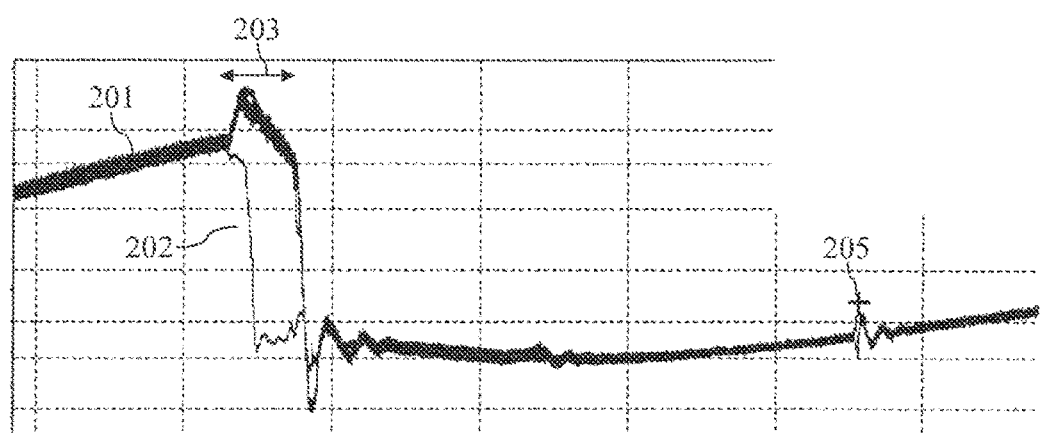
FIG. 2A is an illustration of exemplary rotation speed profiles during a shifting process.
Figure 2B:
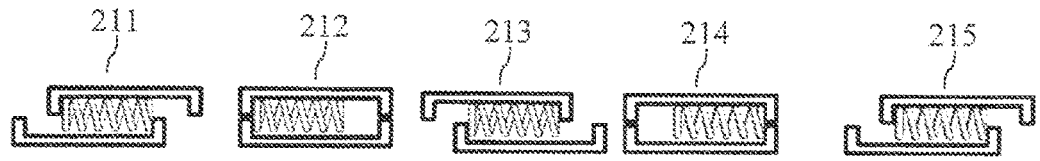
FIG. 2B is a view of exemplary phases of exemplary states of the dual-mass flywheel during a corresponding shifting process.

A shifting process typically results in significant rotation of the dual-mass flywheel 104. This is illustrated by way of example in FIGS. 2A and 2B. In particular, FIGS. 2A and 2B illustrate an upshifting process (for example from a third gear to a fourth gear). An upshifting process typically takes place as part of an acceleration of the vehicle.

The shifting process is initiated by opening the clutch 105. With the clutch open, a new gear is selected in the transmission 106 (that is to say a transmission ratio of the transmission 106 is changed). Furthermore, using an active rotation speed control device can result in automatic adjustment of the rotation speed of the internal combustion engine 102 in order to allow closing of the clutch 105 in a jerk-free manner as far as possible. This is shown, by way of example, in FIG. 2A which shows the time profile of the crankshaft rotation speed 201 and of the input rotation speed 202 of the transmission 106 before, during and following a shifting process (in time period 203). Before the shifting process, the crankshaft rotation speed 201 corresponds to the input rotation speed 202 of the transmission 106. Opening the clutch 105 results in deviations in the rotation speeds 201, 202. In particular, the input rotation speed 202 of the transmission 106 drops on account of upshifting the transmission 106 to a higher gear. The crankshaft rotation speed 201 is then also reduced to the value of the input rotation speed 202 by closing the clutch 105 (possibly as a result of the action of an active rotation speed control device). The crankshaft rotation speed 201 and the input rotation speed 202 are equal again starting from the time at which the clutch 105 is closed.

Significant rotations of the dual-mass flywheel 104 typically occur during and after rapid engagement processes in the event of shifting processes. FIG. 2B shows exemplary phases 211, 212, 213, 214, 215 as part of a shifting process, in particular as part of an upshifting process. In particular, FIG. 2B shows a sequence of phases 211, 212, 213, 214, 215 which can occur in the event of shifting or coupling maneuvers starting from a certain engine rotation speed 201. The sequence of phases shown in FIG. 2B can occur, in particular, in the event of maneuvers in which there is a relatively high differential rotation speed between the engine 102 and the input of the transmission 106 immediately before the engagement and in which engagement takes place relatively rapidly.

Before an upshifting process, the drivetrain is typically in a traction phase, so that the bow springs 143 of the dual-mass flywheel 104 are arranged on the traction side 151 (phase 211). During and after closing of the clutch 105, the bow springs 143 of the dual-mass flywheel 104 are typically stored in a more or less compressed manner on the overrun side 152 owing to drivetrain oscillations (phase 212 and 213). The engagement process usually takes place without load, and the bow springs 143 remain on the overrun side 152 (phase 213). If, after the engagement process, the engine load is now increased out of overrun operation, the flange 145 of the dual-mass flywheel 104 passes through the free angle and is applied on the traction side of the bow springs 143. On account of a high static friction of the bow springs 143, which static friction is caused by centrifugal force, the bow springs 143 can continue to be held on the overrun side 152 in spite of the introduction of the traction phase (phase 214). In the event of a further increase in load, the bow springs 143 which, up until then, were held on the overrun side 152 by the friction caused by centrifugal force can then suddenly slip from the overrun side onto the traction side (phase 215). This process can cause a jerk (see rotation speed oscillations 205 in FIG. 2A) in the drivetrain 100. This jerk is noticeable to a vehicle occupant as a failure in the acceleration process.

A jerk of this kind in the event of a vehicle acceleration following a shifting process can be avoided by targeted torque-transmitting engagement of the engine controller. In particular, a torque can be effected on the primary flywheel disk 141 (for example by the internal combustion engine 102 by way of the crankshaft 103) immediately after rotation speed equalization, during the engagement process, so that the bow springs 143 are stored in a defined manner on the traction side 151 during the drivetrain oscillation (that is to say in phase 212). The bow springs 143 are then already on the traction side 151 in the subsequent load-increasing operation and can no longer slip through the bow spring channel 144 of the dual-mass flywheel 104. Therefore, there is no jerk or failure during the load-increasing operation following a shifting process.

Figure 3:
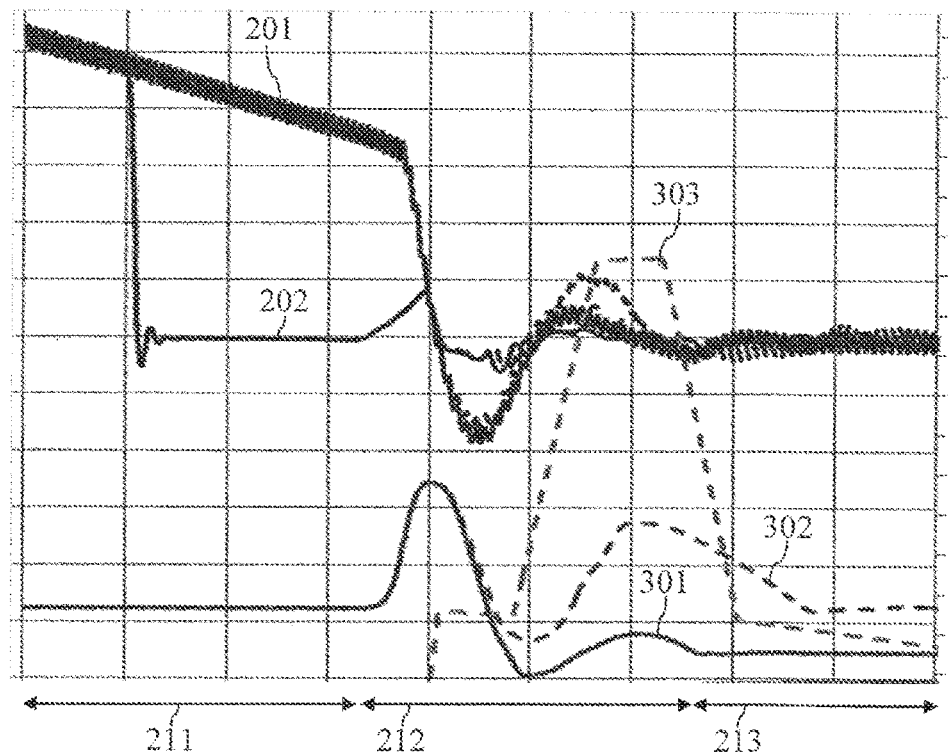
FIG. 3 is an illustration of an exemplary torque-transmitting engagement for avoiding the movement of the bow spring in a dual-mass flywheel onto the overrun side.

FIG. 3 shows exemplary time profiles of the crankshaft rotation speed 201 and of the input rotation speed 202 of the transmission 106 during an upshifting process. Furthermore, FIG. 3 shows the time profile of the position of the bow springs 143 in the dual-mass flywheel 104 during the shifting process. In particular, FIG. 3 shows the profile 301 of the position of the bow springs 143 without torque-transmitting engagement (solid line). It is clear from profile 301 that the bow springs 143 are situated on the traction side 151 before the shifting process (phase 211), and that the bow springs 143 are stored on the overrun side 152 in the event of closing of the clutch 105 (that is to say following the initiation of the closing process of the clutch 105 by the driver of the vehicle) owing to oscillations in the drivetrain 100 (phase 213) and, on account of the static friction which is caused by centrifugal force, remain on the overrun side 152 even after a changeover to traction mode by operation of the accelerator pedal (phase 214).

FIG. 3 further shows a torque-transmitting pulse 303 which is effected on the primary flywheel disk 141 of the dual-mass flywheel 104 during phase 212 of the oscillations in the drivetrain 100. Owing to this torque-transmitting pulse 303, the bow fields 143 are applied in a defined manner to the traction side 151 (as shown by the profile 302 of the position of the bow springs 143 (dashed line). Therefore, the bow fields 143 are situated on the traction side 151 even after the oscillations of the drivetrain 100 die away (that is to say in phase 213), so that sudden slipping of the bow springs 143 from the overrun side 152 to the traction side 151 in the event of subsequent acceleration of the vehicle can be avoided.

Figure 4:
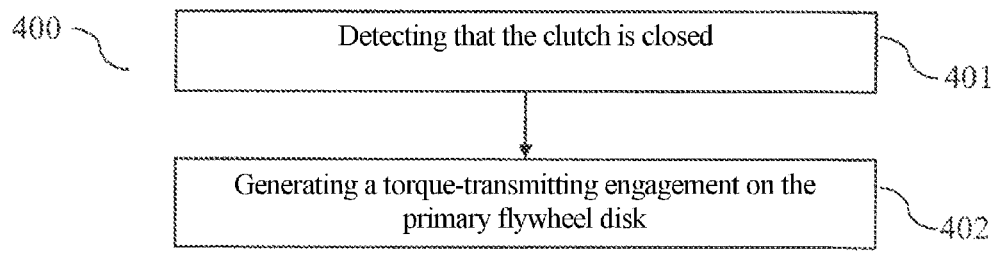
FIG. 4 is a flowchart of an exemplary method for suppressing failures in a drivetrain of a vehicle.

FIG. 4 shows a flowchart of an exemplary method 400 for controlling a drivetrain 100 of a vehicle in the event of a shifting process. The method 400 can be executed by a control unit 101 (for example by an engine control device). The drivetrain 100 includes an engine 102 which is connected to a transmission 106, which can be uncoupled by a clutch 105, by way of a bow spring dual-mass flywheel 104. The dual-mass flywheel 104 includes a bow spring 143 which is arranged in a bow spring channel 144 along a rotation direction of the dual-mass flywheel 104. The bow spring 143 therefore rotates with the dual-mass flywheel 104 and, in the process, a side face of the bow spring 143 is pressed against an inner wall of the bow spring channel 144 on account of the centrifugal force.

The method 400 includes detecting 401 that the clutch 105 is closed as part of a shifting process. In particular, it is possible to detect that a driver of the vehicle causes the clutch 105 to be closed by moving a clutch pedal of the vehicle. The method 400 further includes, independently of a torque request by a driver of the vehicle (that is to say in particular independently of operation of an accelerator pedal of the vehicle), generating 402 a torque-transmitting engagement 303 on the dual-mass flywheel 104 in such a way that the bow spring 143 is arranged on the same side 151, 152 (overrun side or traction side) of the dual-mass flywheel 104 after closing of the clutch 105 as before opening of the clutch 105. This can be achieved, in particular, by static friction of the bow spring 143 in the bow spring channel 144, which static friction is caused by centrifugal force, being assisted by the torque-transmitting engagement 303 and not being overcome as a result. In this case, the torque-transmitting engagement 303 takes place in response to the detected closing process of the clutch 105. The bow spring 143 can be moved to a specific position in the bow spring channel 144 by the torque-transmitting engagement 303. In particular, the torque-transmitting engagement 303 can result in the bow spring 143 remaining on the traction side 151 of the bow spring channel 144, so that the bow spring 143 is prevented from slipping through the bow spring channel 144 in the event of an acceleration maneuver which follows the shifting process.

Therefore, the method 400 described in this document can prevent, in particular, a jerk (that is to say a failure) in the event of accelerations following a shifting maneuver. This can prevent the occupant of a vehicle from being irritated and can increase comfort.

The present invention is not limited to the exemplary embodiments shown. In particular, it should be noted that the description and the figures are intended only to illustrate the principle of the proposed methods, apparatuses and systems. Since modifications of the disclosed embodiments incorporating the spirit and substance of the invention may occur to persons skilled in the art, the invention should be construed to include everything within the scope of the appended claims and equivalents thereof.

What is claimed is:
1. A method for controlling a drivetrain of a vehicle during a shifting process, wherein
   the drivetrain includes an engine which is connected by way of a bow spring dual-mass flywheel to a transmission which is uncouplable by a clutch,
   the dual-mass flywheel includes a bow spring which is arranged in a bow spring channel along a rotation direction of the dual-mass flywheel, and
   the bow spring is arrangeable in the bow spring channel on different sides of the dual-mass flywheel, the method comprising the acts of:
   detecting that the clutch is closed as part of a shifting process; and
   in response to the detecting and independently of a torque request by a driver of the vehicle, generating a torque-transmitting engagement on the dual-mass flywheel such that the bow spring is arranged on a same side of the dual-mass flywheel after closing of the clutch as before opening of the clutch.

2. The method according to claim 1, wherein
the bow spring is arrangeable in the bow spring channel on a traction side or on an overrun side of the dual-mass flywheel, the method further comprising the act of:
storing the bow spring on the traction side of the dual-mass flywheel owing to the torque-transmitting engagement.

3. The method according to claim 1, wherein
the act of generating the torque-transmitting engagement is carried out such that, during a phase in which oscillations are caused in the dual-mass flywheel owing to closing of the clutch, a static friction of the bow spring is assisted.

4. The method according to claim 3, wherein
the dual-mass flywheel includes a primary flywheel disk and a secondary flywheel disk with a flange, wherein the primary flywheel disk and secondary flywheel disk are rotatable in relation to one another, and
the bow spring is compressible in the bow spring channel by a flange vane of the flange in order to transmit a torque from the primary flywheel disk to the secondary flywheel disk, the method further comprising the act of:
assisting, by the torque-transmitting engagement, the static friction between an inner wall of the bow spring channel and the bow spring which is caused by centrifugal force, such that the bow spring remains on the same side of the dual-mass flywheel as before opening of the clutch.

5. The method according to claim 4, wherein
the torque-transmitting engagement is generated by the engine; and/or
the torque-transmitting engagement takes place on a driven side of the dual-mass flywheel.

6. The method according to claim 1, wherein
the act of generating the torque-transmitting engagement is carried out such that, during a phase in which oscillations are caused in the dual-mass flywheel owing to closing of the clutch, a static friction of the bow spring is assisted, but is not overcome.

7. The method according to claim 1, further comprising the acts of:
ascertaining a rotation speed of the engine; and
controlling the torque-transmitting engagement depending on the rotation speed of the engine.

8. The method according to claim 7, wherein
the act of controlling the torque-transmitting engagement is controlling an amplitude of the torque-transmitting engagement depending on the rotation speed of the engine.

9. The method according to claim 1, wherein
the dual-mass flywheel includes a primary flywheel disk and a secondary flywheel disk with a flange, wherein the primary flywheel disk and secondary flywheel disk are rotatable in relation to one another, and
the bow spring is compressible in the bow spring channel by a flange vane of the flange in order to transmit a torque from the primary flywheel disk to the secondary flywheel disk, the method further comprising the act of:
assisting, by the torque-transmitting engagement, a static friction between an inner wall of the bow spring channel and the bow spring which is caused by centrifugal force, such that the bow spring remains on the same side of the dual-mass flywheel as before opening of the clutch.

10. The method according to claim 1, further comprising the acts of:
adjusting a rotation speed of the engine and an input rotation speed of the transmission before the generation of the torque-transmitting engagement; and/or
controlling the generation of the torque-transmitting engagement to take place within a predetermined time after detection of the closing process of the clutch.

11. The method according to claim 10, wherein the predetermined time is equal to or less than 1 second.

12. The method according to claim 11, wherein the predetermined time is equal to or less than 0.5 second.

13. The method according to claim 12, wherein the predetermined time is equal to or less than 0.2 second.

14. The method according to claim 1, further comprising the acts of:
as part of the shifting process,
opening and then closing again the clutch in response to an input by the driver of the vehicle; and
in response to an input by the driver of the vehicle when the clutch is open, changing a transmission ratio of the transmission such that an input rotation speed of the transmission is reduced.

15. The method according to claim 14, further comprising the act of:
reducing a rotation speed of the engine as part of the shifting process after changing the transmission ratio and before closing the clutch.

16. The method according to claim 15, wherein the act of reducing the rotation speed of the engine is carried out by active rotation speed control.

17. The method according to claim 1, wherein
the torque-transmitting engagement is generated by the engine; and/or
the torque-transmitting engagement takes place on a driven side of the dual-mass flywheel.

18. The method according to claim 1, wherein the act of detecting that the clutch is closed is carried out as part of an upshifting process.

* * * * *